Sept. 21, 1954   G. E. AGNEW   2,689,698
FIN CONSTRUCTION AND MOUNTING AND ATTACHING MEANS
Filed Nov. 1, 1949   3 Sheets-Sheet 1
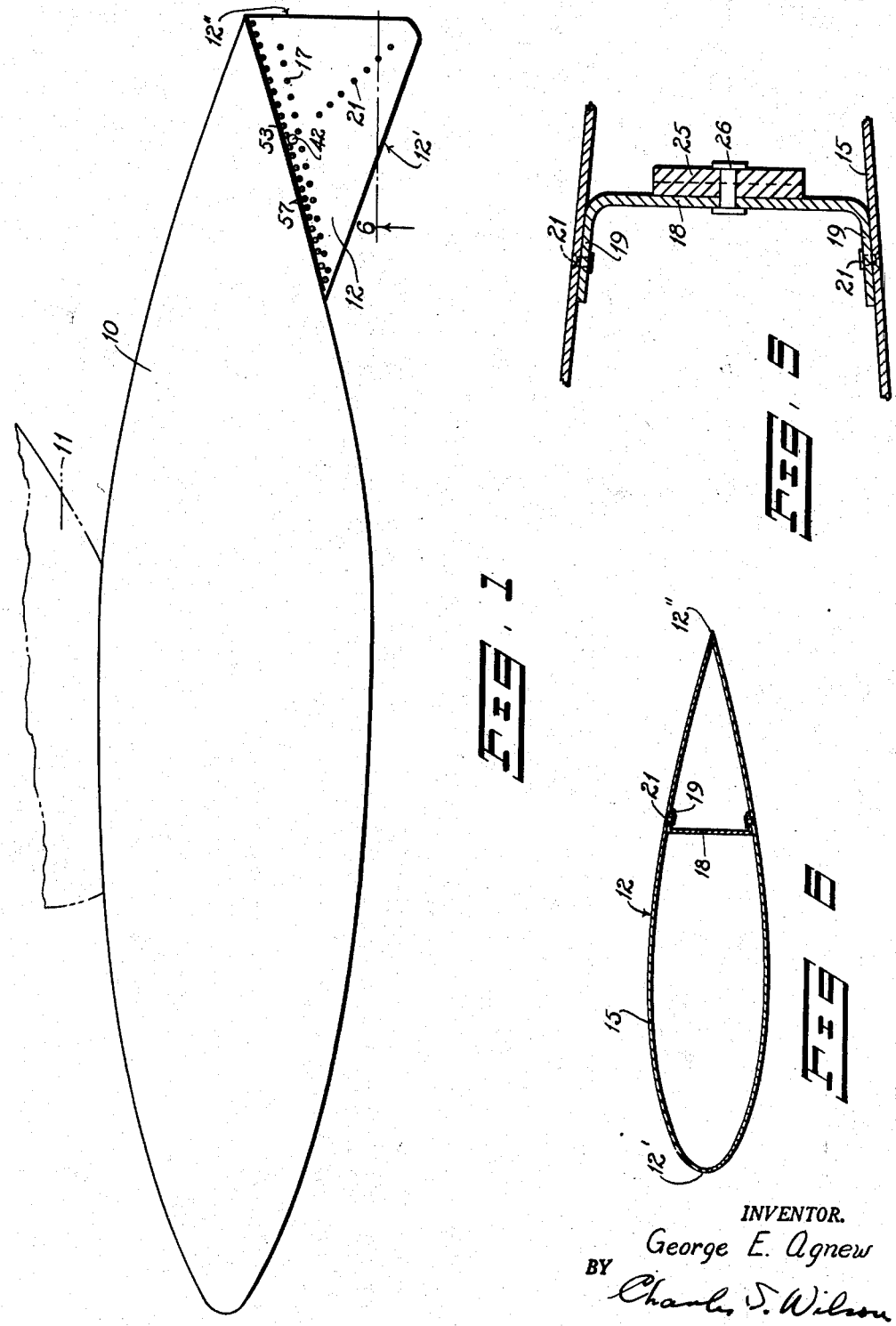
INVENTOR.
George E. Agnew
BY
Charles S. Wilson
ATTORNEY.

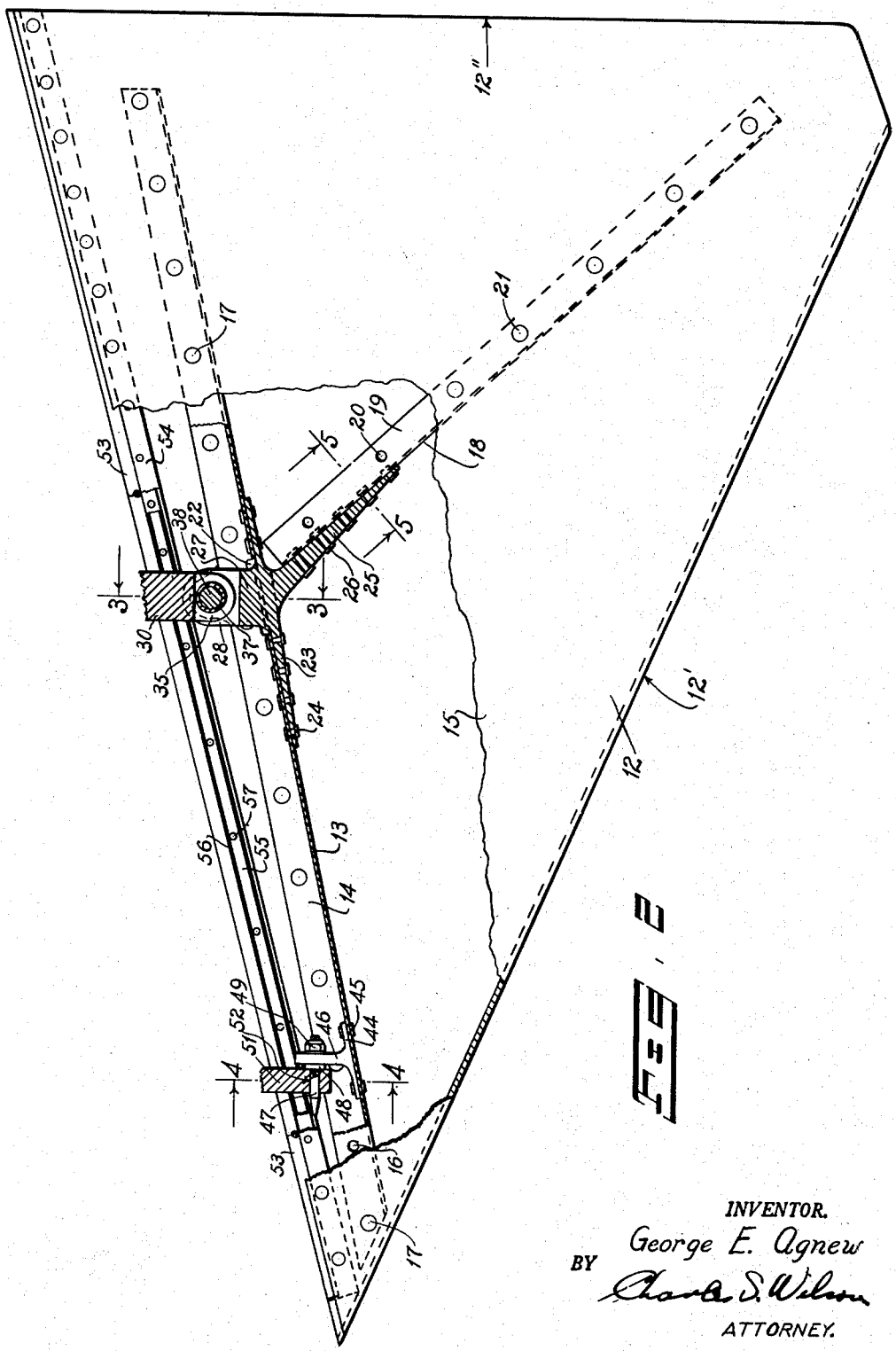

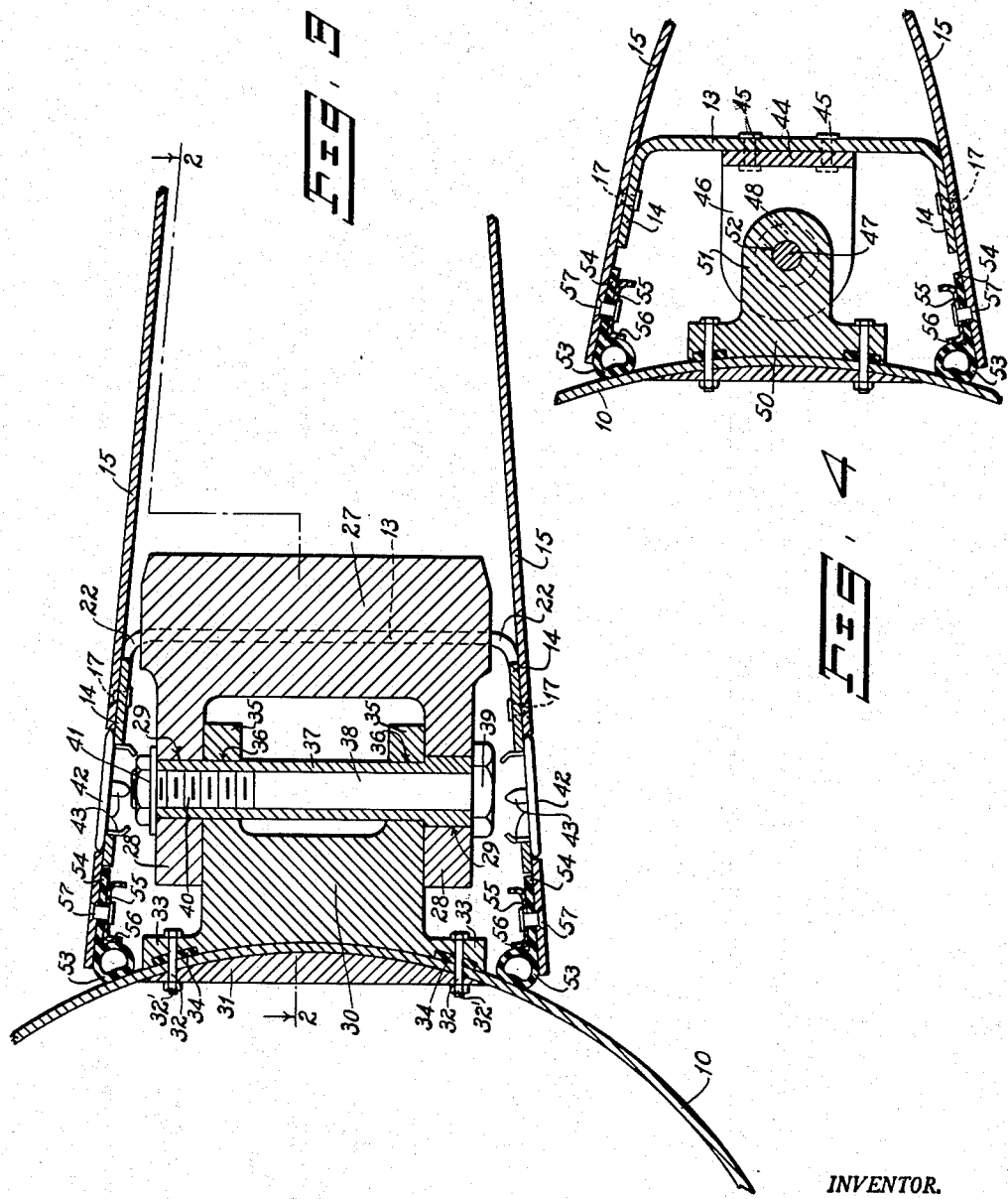

Patented Sept. 21, 1954

2,689,698

UNITED STATES PATENT OFFICE 2,689,698

FIN CONSTRUCTION AND MOUNTING AND ATTACHING MEANS

George E. Agnew, Cold Spring Harbor, N. Y., assignor to Republic Aviation Corporation, near Farmingdale, N. Y., a corporation of Delaware Application November 1, 1949, Serial No. 124,902

16 Claims. (Cl. 244—123)

This invention relates to aircraft structures and particularly relates to the construction of fins to be attached either to an aircraft or to a component thereof, or to an auxiliary structure, such as an external storage tank, to be associated with the aircraft or a part thereof.

The present invention contemplates a fin construction of suitable aerodynamic shape and contour and the mounting thereof either upon an aircraft or a component of the aircraft in such a manner that it may be quickly and easily positioned with respect to, and secured upon, the coacting structure of the aircraft and with equal facility be removed.

Moreover, this fin construction and its mounting and attaching means is especially useful on an external storage container, such as a fuel tank, associated with the wing or other component of the aircraft, which, when in its operative position, may develop unstable or turning moments.

Among its other ends the instant invention provides a mounting and attaching means for the fin which enables it to be quickly, easily and accurately mounted on its coacting structure or as quickly and easily removed therefrom.

With the above and other objects in view as will be apparent this invention consists in the construction, combination and attachment of parts all as hereinafter more fully described, claimed and illustrated in the drawings, wherein:

Fig. 1 is a plan view of an external storage tank installed on or mounted at the tip of a wing, indicated in phantom lines, of an airplane and discloses a fin constructed and mounted thereon in accordance with the present invention;

Fig. 2 is a plan view partly in section along line 2—2 of Fig. 3, of the fin forming the subject matter of the instant invention with a portion of the skin broken away to disclose its internal construction and the means by which it is mounted on a tank or other cooperating structure;

Fig. 3 is a transverse section along lines 3—3 of Fig. 2 to illustrate the single fastening means by which the fin is attached to and mounted on the associated tank structure;

Fig. 4 is a similar section taken along line 4—4 of Fig. 2 to show the construction and operation of the guiding and indexing pin which determines the cooperation of the components of the attaching means when the fin is mounted on the tank;

Fig. 5 is a section along line 5—5 of Fig. 2 to illustrate a rib construction within the fin and its cooperation with the mounting fitting associated with and attached to the spar; and Fig. 6 is a section taken along line 6—6 of Fig. 1 to illustrate the contour of the fin and the cooperation between the skin and rib thereof.

While the present fin construction and its mounting means may be generally employed without reference to the character and purpose of the structure on which it is mounted, it is primarily and especially useful in connection with external storage tanks or containers carried by or mounted upon the wing tips of an airplane. The purpose, utility and position of a fin in association with a tank of this character is fully described and set forth in the co-pending application of Costas E. Pappas, Serial No. 154,487, filed April 7, 1950, and the present invention is restricted particularly in the fin construction and the means by which it is removably mounted on the tank or other associated structure. As pointed out in the aforesaid co-pending application, it is desirable, if not entirely essential, that a fin be mounted upon the outboard side of the aft end of a tank situated upon or adjacent the tip of an airplane wing, said fin to have an airfoil contour or shape. A fin positioned as taught in this co-pending application acts to stabilize the tank by preventing or counteracting the development of turning moments which would adversely affect the stability not only of the tank and associated wing but of the entire airplane as well.

Since external storage tanks are expendable the replacement of destroyed, lost or jettisoned tanks, requires a constant reserve for each airplane of more tanks than is necessary to equip the airplane. Furthermore, because, among other reasons, of their size and shape, it has been found expedient to dismantle these tanks for shipping and storage purposes and to thereafter assemble or reassemble them for use. It is, moreover, desirable to dismantle and/or assemble the tanks quickly and easily since in the servicing of airplanes generally and more especially combat airplanes time is of prime importance.

In dismantling a tank for shipment or storage it is necessary to remove the fin and conversely when the tank is assembled or reassembled for use or installation on an airplane wing it becomes necessary to attach or replace the fin in its operative position thereon. Both the removal and replacement of the fin should be accomplished in minimum time and to that end the instant invention contemplates releasable means for the positive attachment of the fin to the tank at one point only, and also provides an indexing and holding component in association with the single attaching means that automatically guides and establishes the cooperation of the elements of the latter as the fin is moved into position on the tank. Once the fin is mounted on and attached to the tank, this indexing and holding component counteracts any tendency the fin might have to turn or rotate about or move relative to the attaching means.

Additionally, this invention consists of a fin construction that is both light and simple and yet is capable of performing its aerodynamic functions at the same time withstanding all pressures and stresses thereon.

Reference being had more particularly to the drawings, 10 in general designates an external fuel storage tank adapted to be mounted on the tip of an airplane wing 11. The fin 12 is associated with the surface of the tank outboard of the wing 11 and is there secured for easy and quick release and replacement.

The basic structural component of the fin 12 consists of a longitudinal spar 13 disposed along and at the inboard edge of the fin to extend from its leading edge 12' to its trailing edge 12". When the fin 12 is mounted on and attached to the outboard surface of the tank 10 the spar 13 rests in close proximity to and parallel to the surface of the tank terminating at the aft end thereof where the trailing edge 12" of the fin is generally normal to the longitudinal axis of the tank. This spar 13 is U-shaped in section and has its flanges 14 disposed flush against the inner faces of the skin 15 forming the upper and lower surfaces of the fin.

These flanges 14 of the spar 13 are provided with spaced apertures 16 to receive the rivets 17 which pierce the skin 15 enveloping the spar and rigidly secure it to said flanges 14. It is, of course, evident that the skin 15 may be attached to the flanges 14 of the spar 13 in any other acceptable manner, as for example, by welding.

Fixedly and rigidly secured to the spar 13 medially of its ends is a rib 18 which projects and extends from the spar at an acute angle. Like the spar 13 the rib 18 is U-shaped in section and the flanges 19 thereof also rest flush against the adjacent inner faces of the skin 15. These flanges 19 are provided with spaced apertures 20 to receive the rivets 21 that pierce the skin 15 and attach it to the flanges of the rib. As with the spar 13 the skin 15 may be attached to the flanges 19 in any other suitable manner as for example, by welding.

Thus, the fin 12 structurally and basically comprises the longitudinal spar 13 and the lateral rib 18 projecting angularly therefrom, both being wrapped or enveloped by the skin 15 which is fixedly attached to the flanges 14 and 19 respectively of the spar and rib.

To attach the rib 18 to the spar 13 as well as provide a part of the means by which the fin 12 is mounted on and attached to the tank 10, the spar 13 has an opening 22 in its web in approximate alignment with the inner end of the rib that extends between and somewhat into the flanges 14 thereof. A base plate 23 overlies that portion of the web of the spar 13 surrounding and defining the opening 22 to be there secured fixedly and permanently to the web of the spar by the rivets, bolts, or other suitable attaching means 24. Carried by the base plate 23 inwardly of the fin and projecting from said plate at substantially the same angle as the rib 18 is disposed relative to the spar, is an apertured extension or supporting plate 25. This supporting plate rests flush against one surface of the web of the rib 18 where it is permanently and fixedly secured by the rivets, bolts, or other suitable attaching means 26. In this manner the base plate 23 becomes one with the spar 13 and the supporting plate 25 becomes one with the spar 18. The supporting plate 25 may be formed integrally with the base plate 23, or it may be formed separately and be welded or otherwise secured thereto. However, in practice it is preferred that the supporting plate 25 be formed integrally with the base plate 23.

Upon the opposite side of the base plate 23 to the supporting plate 25 and in approximate transverse alignment with the inner end of the latter is a fixed clevis 27, the spaced, parallel arms 28 of which are disposed between and adjoining the flanges 14 of the spar 13 and project toward the inboard side of the fin or edge 12. The clevis 27 and its arms 28 are contained entirely within the limits of the fin 12 whereby the edge portions of the skin 15 extend appreciably beyond the extremities of the arms 28 to the end that when the fin 12 is attached to the tank 10 the edges of the skin 15 merely abut the tank surface thereby reducing the space between the fin and tank to a minimum.

These arms 28 of the clevis 27 are each pierced by an aperture 29, the aperture 29 of one arm 28 being aligned vertically of the clevis with the aperture 29 of the other arm. Like the supporting plate 25 the clevis 27 may be formed separately and welded or otherwise permanently and fixedly attached to the base plate 23, but it is preferred to form it integrally therewith. Therefore, the base plate 23, the supporting plate 25 and the clevis 27 in combination, constitute a unitary fitting the elements of which may be either separately fabricated and assembled into permanent structure, or formed simultaneously and integrally by any method such as forging. Either method of fabrication answers the purposes of the subject invention though the better practice is considered to be a unitary fitting comprising a single forging.

The basic fin structure consists of a base plate 23 rigidly secured to one side of the web of the spar 13, having the clevis 27 fixedly and rigidly secured to one face of the base plate to project through the opening 22 in the web of the spar, and the supporting plate 25 rigidly and permanently secured to the base plate in direct opposition to the clevis 27 at an angle to the plate 23 and spar 13. When the base plate 23 is secured to the spar 13 and the supporting plate 25 is fixedly secured to the rib 18 and the skin 15 is riveted or otherwise attached to the flanges 14 of the spar 13 as well as to the flanges 19 of the rib 18, a sound and substantial structure having the desired aerodynamic shape or contour results.

The fixed clevis 27 is employed as an element of the single means of removably attaching the fin 12 to the tank 10 and the complemental element of such attaching means comprises a bracket 30 secured to the outer surface of the tank 10 sufficiently forward of the aft end of the tank to align with the clevis when the trailing edge 12" of the fin 12 is positioned at the aft end of the tank normal to the longitudinal axis of the latter. This bracket 30 is mounted on the tank by the mounting bolts 32 piercing lugs 33 formed on opposite sides of the bracket 30 and the wall of the tank 10. At their inner ends these bolts 32 also pierce a clamping plate 31 disposed within the tank 10 against the inner surface of the wall thereof and are there threaded and provided with nuts 32'. When the nuts 32' on the mounting bolts 32 are fully tightened against the plate 31 the bracket 30 is fixedly and rigidly secured to the outer surface of the tank 10 with the wall of the tank engaged and clamped between the bracket 30 and plate 31. It will be noted that the surfaces of the bracket 30 and plate 31 abutting opposite surfaces of the tank wall are curved or formed to conform to or agree with the contour of the tank.

To prevent leakage around the mounting bolts 32, an elastic seal or gasket 34 is imbedded in the outer face of each lug 33 to circumscribe or surround the bolt passing through the lug. These seals or gaskets 34 project beyond the faces of the lugs 33 and are compressed as the nuts 32' of the bolts 32 are tightened to effectively prevent any leakage.

The bracket 30 is provided with a pair of spaced parallel arms 35 to be received between the arms 28 of the fixed clevis 27. Each of these arms 35 is pierced by an opening 36 and these openings 36 register with the openings 29 of the arms 28 of the fixed clevis 27 when the fin is in its operative position on the tank.

In order to secure the arms 35 of the bracket 30 to the arms 28 of the clevis, a bushing 37 may be inserted through the registered openings 29 and 36 to terminate with its ends flush with the outer surfaces of the arms 28 of the fixed clevis 27. A bolt 38 is then inserted in the bushing 37 whereupon its head 39 rests flush against the outer surface of one of the arms 28 of the clevis while its opposite threaded end portion 40 projects beyond the outer surface of the opposite arm 28 of the clevis to there cooperate with a nut 41. If desired the bushing 37 may be eliminated in which event the bolt 38 is inserted directly into the registered openings 29 and 36 respectively of the arms 28 and 35 with its head 39 bearing against one arm 28 and its threaded end 40 projecting beyond the other arm 28. When the nut 41 is tightened upon the threaded end portion 40 of the bolt 38, the arms 28 of the clevis 27 are securely clamped between the head 39 on one side and the nut 41 on the other side and the arms 35 of the bracket 30 are secured approximately flush against the inner faces of the arms 28.

Access to the ends of the bolt 38 is provided through the skin 15 and the flanges 14 of the spar 13 to insert or remove the bolt 38 and bushing 37, if the latter is used, and to engage and hold the head 39 of the bolt while the nut 41 is being placed on or removed from the opposite end of the bolt. For that purpose the skin and underlying portions of the opposed flanges 14 of the spar 13 are provided upon each side of the fin with access openings in direct alignment and registration with the ends of the bolt 38 and these openings are of sufficient size to permit the insertion of the necessary wrenches and tools for the manipulation of the nut 41 and head 39 of the bolt 38. These access openings are each closed by an access door or closure 42 the outer surface of which rests flush with the outer surface of the skin 15 of the fin 12. These doors 42 may be of any adaptable shape and construction and may be removably held in place by any operable means. One means which can be employed for that purpose is a plurality of spring prongs 43, arranged circumferentially around the inner surface of the door 42 and adapted to engage the edges of the corresponding openings in the skin 15 and the underlying flange 14 of the spar 13.

As will be seen the fin is primarily attached to and carried by the tank 10 through the medium of the union between the arms 28 of the fixed clevis 27 carried by the fin and the arms 35 of the bracket 30 carried by the tank which union is established and maintained by the bolt 38. Manifestly, the bolt 38 in its operative position establishes this primary and single point of attachment and its removal releases the engagement between the clevis 27 on the one hand and the bracket 30 on the other. It will also be observed that at this single or primary attachment between the fin 12 and the tank 10, and elsewhere between the fin and tank there are no exposed or projecting parts which would interfere with or break the smooth aerodynamic contour of the fin nor is there any appreciable space between the fin and tank, such small spaces or openings occurring between the fin and tank are closed and sealed as will be hereinafter described.

Between the leading edge 12' of the fin 12 and the clevis 27 the outer surface of the web of the spar 13 is provided with a plate 44 rigidly and permanently secured thereto between the flanges 14 by rivets 45 or other suitable attaching means. This plate 44 carries an integral outstanding ear 46 to which is attached an indexing pin 47 tapered at its free end and having a shoulder 48 threaded thereon adjoining its opposite end. This shoulder 48 is to cooperate with one surface of the ear 46 while the threaded end portion of the pin 47 projects through an opening provided for that purpose in the ear and beyond the opposite surface of the ear. A nut 49 is threaded upon the projecting end portion of the pin 47 and rigidly and adjustably attaches the index pin to the spar. By adjusting the shoulder 48 and the nut 49 on the threaded end portion of the pin 47 the position of the latter relative to the ear 46 may be regulated. If the parts are accurately made and assembled no further adjustment of the pin 47 relative to the ear is needed and ordinarily the shoulder 48 will rest flush against one surface of the ear 46 whereupon the ear is clamped between it and the nut 49. Under these circumstances the shoulder 48 could be integral with the pin 47. However, on occasion to insure the proper functioning of both the pin 47 and the shoulder 48, as will be seen, it may be necessary to position the shoulder out of flush contact directly with the ear 46. In that event one or more washers or shims (not shown) of the required thickness may be mounted on the pin 47 between the shoulder 48 and the ear 46 and the position of the shoulder 48 on the pin adjusted accordingly. The purpose and utility of this arrangement will become hereinafter apparent.

For cooperation with the pin 47 a secondary bracket 50 is attached to the tank 10 in alignment longitudinally thereof with the bracket 30 and its means of attachment to the tank as illustrated in Fig. 4 is identical with the means of attaching the bracket 30 to the tank. This secondary bracket 50 carries an outstanding ear 51 which is provided with an opening 52 for the reception of the indexing pin 47. When the fin 12 is to be mounted upon the tank the indexing pin 47 is inserted in the opening 52 of the ear 51 of the bracket 50 until the shoulder 48 thereof abuts the adjacent surface of said ear 51. This abutting contact between the shoulder 48 and the ear 51 establishes the accurate registration of the openings 29 and 36 respectively of the arms 28 and 35 of the fixed clevis 27 and the bracket 30 whereupon the bolt 38 may be seated therein as above described. Manifestly the position of the shoulder 48 on the pin 47 and relative to the ear 46 plays an important part in this registration of the openings 29 and 36 as aforesaid. If it is not properly positioned its abutment with the ear 51 on the tank 10 will not insure the required registration of the openings 29 and 36 and its position must then be adjusted by the aforesaid means provided for that purpose until its contact with the ear 51 will establish accurate registration of said openings. This means of adjustment is merely a precautionary device which ordinarily will not need to be resorted to. In addition to its function of indexing the registration of the openings 29 and 36, the pin 47 in cooperation with the ear 51 also supports the leading edge of the fin and counteracts any remote tendency of the fin to rotate or move relative to the tank about its single point of attachment, viz., the clevis 27 and bracket 30 united by the bolt 38.

It will be noted from Figs. 3 and 4 that the edges of the skin 15 of the fin 12 are spaced somewhat from the wall of the tank when the fin is in its operative position. This space if unsealed or not closed would create a break in the aerodynamic contour of the fin where it joins the tank and would therefore, decrease the efficiency of the fin. On the other hand if the edges of the skin are brought into abutment with the wall of the tank 10 to close this space the vibration of the airplane or aircraft might cause the edges of the skin 15 of the fin 12 to abrade or rub the wall of the tank and thereby produce leaks at the lines of abutment. Hence, to close the spaces intentionally left between the edges of the skin 15 and the wall of the tank 10, and also to cushion the fin 12 upon the wall of the tank 10, a tubular seal 53 of rubber or other flexible or elastic material is disposed coextensively along the inner surface of each edge of the skin 15 to project outwardly beyond the coacting edge of the skin so that when the fin is in its operative position the seal 53 bears against the outer surface of the tank 10 and is there compressed. Thus the opening between the edge of the skin 15 and the wall of the tank 10 is effectively closed and a sealing cushion is provided between the skin 15 and the tank 10. In order to mount each of the seals 53 in its operative position it is provided with a coextensive flap 54 which rests flush against the inner surface of the skin 15 adjoining the edge thereof. A clamping strip 55 of the same length as the flap 54 and the seal 53 is disposed over the flap 54 and clamps the flap between it and the inner surface of the skin. This strip is held in place by rivets 57 or other attaching means which pierce the skin 15, the flap 54 and the strip 55. Along its longitudinal edges the strip 55 is bent angularly to form the integral flanges 56 thereby producing a substantially U-shaped cross-section for the clamping strip 55. When this strip is in its operative position one of these flanges 56 abuts against the seal 53 and eliminates any tendency thereof to move inwardly of the fin 12 and away from its sealing contact with the tank. The flange 56 of the clamping strip 55 in contact with the seal 53 also acts to compress the latter. Thus when the fin 12 is mounted upon the tank 10 the seals 53 are compressed between the wall of the tank 10 and one of the flanges 56 of the coacting clamping strip 55. From the foregoing it is evident that the fin 12 may be mounted in its operative position on the tank 10 by inserting the indexing pin 47 in the opening 52 of the gear 51 on the secondary bracket 50 and then moving the fin longitudinally and forwardly of the tank until the shoulder 48 abuts the ear 51. At this point the openings 29 and 36 respectively of the clevis 27 and bracket 30 are registered and the access doors or closures 42 may be removed for the insertion of the bolt 38, as well as the bushing 37 if one is used, in these registered openings. Appropriate tools can then be inserted through the opposed access openings to engage and hold the head 39 of the bolt 38 while the nut 41 is tightened. When the fin 12 is thus secured in place on the tank 10 the closures or doors 42 may be returned to the access openings. To remove the fin 12 from the tank 10 the doors or closures 42 are extracted from their access openings and the bolt 38, and the bushing 37, if one is used, is removed from the registered openings 29 and 36 and in doing so reversing the aforesaid operations. When the bolt 38 is removed, the fin is moved longitudinally and aftwardly of the tank 10 until the pin 47 is disengaged by the opening 52 of the ear 51. As soon as the bolt 38 is removed from the registered openings 29 and 36 the doors or closures 42 may be returned to their positions in the access openings for there will then be no occasion to have further access to the interior of the fin.

It will at once be apparent that the tank 10 and its coacting, outboard fin 12 may, without structural change, be used in conjunction with either wing 11 of an airplane. To do this the tank 10 is merely rotated through 180° from the position shown in the drawings to cooperate with the wing opposite to that shown whereupon the fin 12 will continue to be on the outboard side of the tank. The only effect of so rotating the tank 10 to adapt it to an opposite wing 11 would be the reversal of the position of the bolt 38 which is unimportant.

The present invention has been shown and described herein in conjunction with an external storage tank of an airplane. However, the instant fin construction and mounting means can, without material change, be adapted to any aircraft component. For example, it can as well be used for the dorsal fin on a fuselage. In short though this fin construction and mounting and attaching means is primarily intended for use on a wing tip tank and is admirably suited to that purpose, it can be employed wherever a fin is to be used and mounted, especially if such fin is to be quickly removed and/or replaced.

What is claimed is:

1. The combination with an external storage tank for an aircraft, of a bracket secured to and projecting outwardly from the tank including a pair of spaced parallel arms provided with aligned openings therein, an apertured ear secured to and projecting outwardly from the tank in alignment longitudinally of the tank with said bracket and positioned in a plane substantially at right angles to the planes of said arms, an elongated fin spar, U-shaped in section, positioned adjacent and substantially parallel to the tank, a clevis fixedly secured to said spar and having a pair of parallel arms projecting therefrom, said arms being so spaced one from the other that the arms of said bracket may be received between them and provided with aligned openings to register with the aligned openings of the bracket arms, a pin having an abutment adjacent one end secured to the spar to be seated in the aperture of the ear of the tank with the abutment in contact with the ear to thereby establish registration of the openings in the arms of the bracket and clevis, a bolt positioned in the registered openings aforesaid to secure the clevis to said bracket, a skin enveloping and secured to the flanges of the spar, and an access opening and removable closure therefor provided in the skin in alignment with each end of the bolt aforesaid.

2. The combination with an external storage tank for an aircraft, of a bracket secured to and projecting outwardly from the tank including a pair of spaced parallel arms provided with aligned openings therein, an apertured ear secured to and projecting outwardly from the tank in alignment longitudinally of the tank with the bracket and positioned in a plane substantially at right angles to the planes of said arms, an elongated fin spar, U-shaped in section, positioned adjacent and substantially parallel to the tank, a clevis fixedly secured to said spar and having a pair of parallel arms projecting therefrom, said arms being so spaced one from the other that the arms of the bracket may be received between them and provided with aligned openings to register with the aligned openings of the bracket arms, a pin having an abutment adjacent one end secured to the spar to be seated in the aperture of the ear on the tank with its abutment contacting said ear to thereby establish registration of the openings in the arms of the bracket and clevis, a bolt positioned in the registered openings aforesaid to secure the clevis to said bracket, a rib, U-shaped in section, secured to the spar in opposition to the clevis to project at an acute angle from the spar, a skin enveloping both the spar and rib and fixedly attached to the flanges of each, and means of access to opposed ends of the bolt through the skin.

3. The combination with an external storage tank for an aircraft, of a bracket secured to and projecting outwardly from the tank including a pair of spaced parallel arms provided with aligned openings therein, an apertured ear secured to and projecting outwardly from the tank in alignment longitudinally of the tank with the bracket and in a plane substantially at right angles to the planes of said arms, an elongated fin spar, U-shaped in section, positioned adjacent and substantially parallel to the tank, a clevis fixedly secured to said spar and having a pair of parallel arms projecting therefrom said arms being so spaced one from the other that the arms of the bracket may be received between them and provided with aligned openings to register with the aligned openings of the bracket arms, a pin having an abutment adjacent one end secured to the spar to be seated in the aperture of the ear on the tank with the abutment in contact with the ear to thereby establish registration of the openings in the arms of the bracket and clevis, a bolt positioned in the registered openings aforesaid to secure the clevis to said bracket, a rib, U-shaped in section, secured to the spar in opposition to the clevis to project at an acute angle to the spar, a skin enveloping said par and rib to rest flush upon and be attached to the flanges of each, the edges of the skin adjacent the spar and tank being spaced one from the other by the spar to permit the cooperation of the arms of the clevis and bracket and of the pin and ear, and normally closed means of access through the skin to the opposed ends of the bolt aforesaid.

4. The combination with a tank to be mounted on an aircraft, of a bracket secured to and projecting outwardly from the tank including a pair of spaced parallel arms provided with aligned openings therein, an apertured ear secured to and projecting outwardly from the tank in alignment longitudinally of the tank with the bracket and in a plane substantially at right angles to the planes of said arms, an elongated fin spar, U-shaped in section, positioned adjacent and substantially parallel to the tank, a clevis fixedly secured to said spar having a pair of parallel arms projecting therefrom, said arms being so spaced one from the other that the arms of the bracket may be received between them and provided with aligned openings to register with the aligned openings of the bracket arms, a pin having an abutment adjacent one end secured to the spar to be seated in the aperture of the ear on the tank with its abutment in approximate contact with said ear upon the registration of the openings in the arms of the bracket and clevis, a bolt positioned in the registered openings aforesaid to secure the clevis to said bracket, a rib, U-shaped in section, secured to the spar in opposition to the clevis to project at an acute angle therefrom, a skin enveloping said spar and rib to rest flush upon and be attached to the flanges of each, said skin being formed into an airfoil contour with its leading edge at one end of the spar and sloping outwardly and aftwardly therefrom and its trailing edge at the opposite end of the spar and extending outwardly normal to the axis of the tank at the trailing end thereof, the edges of the skin adjoining the tank being held in spaced relationship by the spar, and normally closed means provided in the skin in registration with each end of the bolt aforesaid to permit access to the ends thereof.

5. The combination with an external storage tank for an aircraft, of a bracket secured to and projecting outwardly from the tank including a pair of spaced parallel arms provided with aligned openings therein, an apertured ear secured to and projecting outwardly from said tank in alignment longitudinally of the tank with the bracket and in a plane substantially at right angles to the planes of said arms, an elongated fin spar, U-shaped in section, positioned adjacent and substantially parallel to the tank, a clevis fixedly secured to said spar and having a pair of parallel arms projecting therefrom said arms being so spaced one from the other that the arms of the bracket may be received between them and provided with aligned openings to register with the aligned openings of the bracket arms, a pin, having an abutment thereon, secured to the spar to be seated in the aperture of said ear on the tank with the abutment in contact with the ear to thereby establish registration of the openings in the arms of the bracket and clevis, a bolt positioned in the registered openings aforesaid to releasably secure the clevis to said bracket, at least one rib, U-shaped in section, secured to the spar in opposition to the clevis, a skin enveloping both spar and rib to rest flush on and be attached to the flanges of each, said skin having the contour of an airfoil with its leading edge disposed at one end of the spar and its trailing edge located at the opposite end of the spar with the edges of the skin adjoining the tank held spaced one from the other and approximately parallel to the tank by said spar, the skin being also provided with an access opening in alignment with each end of said bolt, a flush closure for each of said access openings, and a seal between the tank and each adjacent edge of the skin.

6. The combination with an external storage tank for mounting on an aircraft, of a bracket secured to and projecting outwardly from the tank including a pair of spaced parallel arms provided with aligned openings therein, an apertured ear secured to and projecting outwardly from the tank in longitudinal alignment of the tank with the bracket and positioned in a plane substantially at right angles to the planes of said arms, an elongated fin spar, U-shaped in section, positioned adjacent and substantially parallel to the tank, a clevis fixedly secured to said spar having a pair of parallel arms projecting therefrom, said arms being so spaced one from the other that the arms of the bracket may be received between them and provided with aligned openings to register with the aligned openings of the bracket arms, a pin having an abutment thereon secured to the spar to be seated in the aperture of said ear on the tank with the abutment in contact with the ear to thereby establish registration of the openings in the arms of the bracket and clevis, a bolt positioned in the registered openings aforesaid to secure the clevis to said bracket, at least one rib, U-shaped in section, secured to and projecting from the spar in opposition to the clevis, a skin enveloping both spar and rib to rest flush on and be attached to the flanges of each and shaped to airfoil contour with its leading and trailing edges at opposite ends of the spar and the edges of the skin between the leading and trailing edges of the fin being disposed adjoining the tank and held in spaced relationship by the spar, and an access opening and removable closure in the skin in registration with each end of the bolt aforesaid.

7. The combination with an external storage tank for an aircraft, of a bracket secured to and projecting outwardly from the tank including a pair of spaced parallel arms provided with aligned openings therein, an apertured ear secured to and projecting outwardly from the tank in longitudinal alignment of the tank with the bracket and positioned in a plane substantially at right angles to the planes of said arms, an elongated fin spar, U-shaped in section, positioned adjacent and substantially parallel to the tank, a clevis fixedly secured to said spar and having a pair of parallel arms projecting therefrom, said arms being so spaced one from the other that the arms of the bracket may be received between them and provided with aligned openings to register with the aligned openings of the bracket arms, a pin secured to the spar to be reciprocated in the aperture of the ear on the tank as the openings in the arms of the bracket and clevis move into and out of registration, a bolt positioned in the registered openings aforesaid to removably secure the clevis to said bracket, a rib, U-shaped in section, secured to and projecting from the spar in opposition to the clevis, a skin enveloping and attached to the flanges of both spar and rib to create an airfoil having its leading and trailing edges disposed at opposite ends of the spar, the edges of the skin between the leading and trailing edges of the contour being held in spaced relationship by the spar adjacent and approximately parallel to the tank, a tubular seal positioned along and projecting beyond each edge of the skin to have bearing and sealing contact with the surface of the tank, and means for attaching the seal to the inner face of the edge of the skin with which it coacts.

8. The combination with a tank for external storage on an aircraft, of a bracket secured to and projecting outwardly from the tank including a pair of spaced parallel arms provided with aligned openings therein, an apertured ear secured to and projecting outwardly from the tank in alignment longitudinally of the tank with the bracket and in a plane substantially at right angles to the planes of said arms, an elongated fin spar, U-shaped in section, positioned adjacent and substantially parallel to the tank, a clevis fixedly secured to said spar, medially of its ends, having a pair of parallel arms projecting therefrom said arms being so spaced one from the other that the arms of the bracket may be received between them and provided with aligned openings to be moved into and out of registration with the aligned openings of the bracket arms, a pin secured to the spar to be reciprocated in the aperture of the ear on the tank as the openings in the arms of the bracket and clevis move into or out of registration, a bolt to be inserted in the registered openings aforesaid to thereby secure the clevis to said bracket, a rib, U-shaped in section secured to and projecting from the spar in opposition to the clevis, a skin enveloping and attached to the flanges of both spar and rib to create an airfoil having its leading and trailing edges disposed at opposite ends of the spar and with the edges of the skin between said leading and trailing edge held in spaced relationship by the spar adjacent and approximately parallel to the tank, a tubular, elastic seal positioned along and projecting beyond each edge of the skin to have bearing and sealing contact with the surface of the tank, a flap secured to each seal extending over and flush against the inner face of the coacting edge of the skin, and a clamping plate disposed over each flap to engage it against the inner surface of the skin, said plate being provided with a flange along one side to abut and bear against the seal, whereby the seal compresses between the tank and said flange.

9. The combination with an external storage tank for an aircraft, of a fin comprising an internal frame member and a skin enveloping said frame member, said fin being adapted to be mounted on said tank with its frame member disposed substantially parallel to and adjacent the tank and the edges of the skin in approximate abutment with the tank on opposite sides of said frame member, sealing means carried by the edges of the skin and organized and arranged to sealingly engage the tank, and means of attachment disposed between the tank and the frame member whereby the latter may be secured to the former said means including means for its release and the removal of the fin from the tank.

10. An aircraft fin comprising a spar, a rib projecting laterally from said spar, a base plate secured to the spar, a clevis fixed to and projecting from one face of said base plate, a supporting plate fixed to the base plate in opposition to said clevis and secured to the rib, and a skin enveloping and attached to both the rib and the spar with its edges disposed on opposite sides of the clevis aforesaid.

11. An aircraft fin comprising a spar having an opening therein, a rib projecting laterally from the spar, a base plate fixedly secured to one face of the spar on each side of said opening, a mounting clevis rigidly carried by the base plate to project through the opening in the spar, a supporting plate rigidly carried by the base plate in opposition to the clevis and rigidly secured to the rib, and a skin having an airfoil contour enveloping and secured to both the spar and rib with the leading edge of the contour at one end of the spar, the trailing edge of the contour at the opposite end of the spar, and the edges of the skin spaced by the spar.

12. An aircraft fin comprising a spar having an opening therein medially of its length, a base plate fixedly secured to the spar on each side of the opening, a mounting member rigidly carried by the base plate to project through the opening in the spar, a supporting plate rigidly carried by the base plate in opposition to the mounting member to project laterally from the spar, a rib secured to said supporting plate, and a skin formed to airfoil contour enveloping and attached to both rib and spar with its edges separated by the latter.

13. An aircraft fin comprising a spar having an opening therein medially of its length, a base plate fixedly secured to the spar on each side of the opening, a mounting member rigidly carried by the base plate to project through the opening in the spar, a supporting plate rigidly carried by the base plate in opposition to the mounting member to project laterally from the spar, a rib secured to said supporting plate, a pin positioned approximately parallel to and spaced from the spar between one end of the spar and the mounting member, and a skin formed to airfoil contour enveloping and secured to both spar and rib with the leading edge of the contour at one end of the spar and the trailing edge thereof at the opposite end of the spar and the edges of the skin disposed in spaced relation on opposite sides of the spar to allow unobstructed access to both the mounting member and the pin.

14. The combination with an aircraft structure, of a fin comprising an internal frame member including one spar and one rib and an enveloping skin, said fin adapted to be mounted on said structure with the spar of the frame member disposed substantially parallel and adjacent to the structure and with the edges of the skin in approximate abutment with said structure on opposite sides of the aforesaid spar of the frame member, single point interlocking attachment means between the fin and structure comprising interengaging mounting elements including a single element carried by the structure, a single element carried by the frame member and removable means to lock said mounting elements in interengagement, and adjustable indexing means consisting of a pin carried by the fin and an apertured ear carried by the structure, said pin being organized and arranged to be received in the aperture of said ear and having means of adjustment to regulate the position of said pin on the fin and its cooperation with said ear to thereby establish and determine the alignment of said mounting elements as the fin is mounted on the structure.

15. The combination with an aircraft structure, of a fin removably associated therewith comprising an internal frame and a skin enveloping said frame, said fin being adapted to be mounted on said structure with a part of the frame substantially parallel to and adjacent the structure and with the edges of the skin in approximate abutment with the structure on each side of the aforesaid part of the frame, interlocking attachment means between the fin and structure including a single mounting element attached to the frame, a single complemental mounting element carried by the structure and organized to cooperate with the mounting element of the frame in mounting the fin to the structure and a bolt removably coacting with the cooperating mounting elements to thereby releasably interlock the cooperating mounting elements of the fin and the structure, and adjustable indexing means including a first member carried by the structure and a second member carried by the frame for cooperative engagement with the first member, said second member being adjustable relative to the frame to regulate the position of the second member on the fin and the cooperation of the second member with the first member to thereby establish and determine the alignment of the cooperating mounting elements as the fin is mounted on the structure, said adjustable indexing means also being effective to counteract any tendency of the fin to turn on the cooperating mounting elements as a pivot.

16. The combination with an aircraft structure, of a fin comprising a spar and a skin shaped to an airfoil contour and fixedly attached to the said spar, said fin to be removably mounted on the structure with its spar substantially parallel to the structure and the edges of its skin disposed adjacent the surface of the structure on opposite sides of the spar, primary interlocking means of attachment carried by the spar medially of its length and by the structure to rigidly and removably mount the fin to the structure, and secondary interlocking means including adjustable indexing means comprising a member mounted to the structure and a member mounted to the spar, one of said members being adjustable relative to its mounting to align the primary interlocking means and to counteract any turning moment of the fin relative to the structure about said primary interlocking attachment means.

References Cited in the file of this patent

UNITED STATES PATENTS

| Number | Name | Date |
| --- | --- | --- |
| 1,344,558 | Nieukirk | June 22, 1920 |
| 1,499,900 | Zucker | July 1, 1924 |
| 1,967,795 | Wallis | July 24, 1934 |
| 2,210,163 | Boyd | Aug. 6, 1940 |
| 2,273,919 | Allward | Feb. 24, 1942 |
| 2,283,223 | Nallinger | May 19, 1942 |
| 2,416,104 | Lerche | Feb. 18, 1947 |
| 2,417,342 | Bach | Mar. 11, 1947 |
| 2,425,099 | Klose | Aug. 5, 1947 |
| 2,432,078 | Adler | Dec. 9, 1947 |
| 2,616,509 | Thomas | Nov. 4, 1952 |

FOREIGN PATENTS

| Number | Country | Date |
| --- | --- | --- |
| 384,750 | Germany | Nov. 9, 1923 |
| 609,456 | Great Britain | Sept. 30, 1948 |